UNITED STATES PATENT OFFICE.

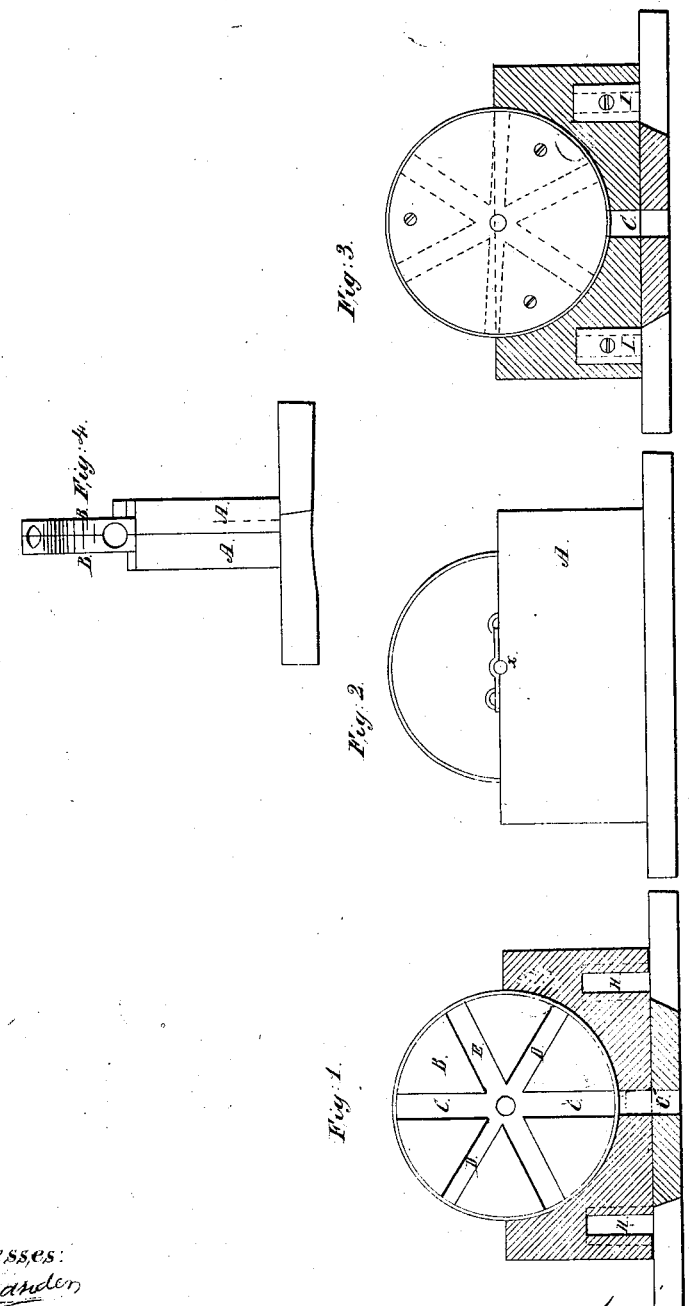

JOHN J. WATSON, OF BUFFALO, NEW YORK.

TAPPING GAS AND WATER PIPES.

Specification of Letters Patent No. 30,901, dated December 11, 1860.

*To all whom it may concern:*

Be it known that I, JOHN J. WATSON, of Buffalo, in the county of Erie and State of New York, have invented certain new and useful Improvements in Apparatus for Tapping Water and Gas Pipes Under Pressure; and I do hereby declare that the following is a full, clear, and exact description of the same, reference being had to the accompanying drawings and to the letters of reference marked thereon.

The nature of my invention consists in constructing and arranging the several parts of this apparatus in the manner hereinafter described.

In the annexed drawings making a part of this specification, A, represents a box, made of any suitable size, and of any desired material. This box is made in two parts, being divided longitudinally as shown, one part being provided with dove tailed grooves, H, H, and the other with dove tailed tongues I, I, which fit snugly into the grooves and secure the two parts together. The two parts of the box may be readily separated by slipping the tongues out of the grooves and then drawing them apart.

B, represents a wheel, which is also divided in two parts, being cut through its periphery so as to form two disks when the parts are separated. This wheel is let into an opening in the box, made to receive it to its trunnions. One portion of the trunnion is secured to one half of the wheel, and the other portion to the other half. The trunnions of the wheel rest upon and have their bearings upon the box so that when the wheel revolves its lower half is always in the opening in the box.

C, D, and E, represent three holes which are made through the wheel B, running from one side of the periphery to the other through the center of the wheel. These holes are of different sizes. The smallest is intended to receive the drill, the next in size receives the tap, and the third receives the pipe which is to be connected to the gas or water pipe.

C′, represents a hole made through the box in the manner shown, so that when the wheel B is revolved the holes in said wheel will alternately come in line with said hole in the box. Fig. 1 shows the hole C of the wheel, in line with the hole C′ of the box, so that a pipe may be run through the two.

In using this apparatus the box A is secured in some convenient manner to the pipe to be tapped. The hole D, of the wheel is then turned in line with the hole C′, and the drill being inserted an opening is made in the water or gas pipe. The point of the drill is then drawn out of the pipe C′, and the wheel B is partially revolved, so as to cut off the communication as shown in Fig. 3. The tap is then inserted in the hole E, and the wheel is turned so that hole E, comes in line with hole C′. The tap then cuts the screw and its point is drawn out of hole C′, and the wheel partially revolved as before to cut off communication. The pipe to be connected is then inserted in the hole C′, and said hole is made by turning the wheel to correspond with the hole C′, and the pipe is then screwed into the gas or water pipe to its proper place. The end of the pipe connected is of course stopped, while this operation is going on, by a stop cock. After the connection has been made, I slide the tongues I, I, out of the grooves H, H, and thus remove the two parts of the box. I then take out the screws which hold the two parts of the wheel together, and remove each part from around the pipe. The connection is then complete and the machine is removed, ready for another operation.

Having thus fully described my invention what I claim as new and desire to secure by Letters Patent is—

The employment of the wheel B provided with holes D, C, E, and divided in two parts through its periphery substantially as and for the purpose herein specified.

JOHN J. WATSON.

Witnesses:
C. M. ALEXANDER,
A. I. HARDIN.